(12) United States Patent
Stewart et al.

(10) Patent No.: US 11,135,813 B2
(45) Date of Patent: Oct. 5, 2021

(54) WOOD-BASED MATERIAL INSULATED FOR COMBUSTION RESISTANCE

(71) Applicant: DDP SPECIALTY ELECTRONIC MATERIALS US, LLC, Wilmington, DE (US)

(72) Inventors: Gregory T. Stewart, Midland, MI (US); Matthew J. Kalinowski, Midland, MI (US); Kshitish A. Patankar, Midland, MI (US); Dakai Ren, Lake Jackson, TX (US); Steven P. Crain, Midland, MI (US); Ernest J. Herst, Midland, MI (US); Daniel W. Cheney, Boise, ID (US); Jeffrey K Olson, White City, OR (US); Tyler G. Congleton, White City, OR (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 66 days.

(21) Appl. No.: 16/323,271

(22) PCT Filed: Jul. 31, 2017

(86) PCT No.: PCT/US2017/044585
§ 371 (c)(1),
(2) Date: Feb. 5, 2019

(87) PCT Pub. No.: WO2018/031270
PCT Pub. Date: Feb. 15, 2018

(65) Prior Publication Data
US 2020/0189241 A1 Jun. 18, 2020

Related U.S. Application Data

(60) Provisional application No. 62/372,848, filed on Aug. 10, 2016.

(51) Int. Cl.
*B32B 21/04* (2006.01)
*B32B 3/26* (2006.01)
(Continued)

(52) U.S. Cl.
CPC ............ *B32B 21/047* (2013.01); *B32B 3/266* (2013.01); *B32B 5/18* (2013.01); *B32B 5/245* (2013.01);
(Continued)

(58) Field of Classification Search
CPC ....... B32B 21/047; B32B 21/02; B32B 21/14; B32B 3/266; B32B 5/18; B32B 7/12; B32B 7/08; B32B 2266/0278
See application file for complete search history.

(56) References Cited

U.S. PATENT DOCUMENTS

| | | |
|---|---|---|
| 3,991,252 A | 11/1976 | Kolakowski et al. |
| 4,852,322 A | 8/1989 | McDermid |

(Continued)

FOREIGN PATENT DOCUMENTS

| | | |
|---|---|---|
| CN | 103587153 A | 2/2014 |
| CN | 204212280 U | 3/2015 |

(Continued)

OTHER PUBLICATIONS

Clift et al, New Polyisocyanurate Catalysts for Rigid Polyurethane Foams, SPI Conference 1994, Abstract No. 112, Session N.
(Continued)

*Primary Examiner* — Hai Vo

(57) ABSTRACT

A fire retardant article has a wood-based material with a polyisocyanurate foam article attached thereto, where the polyisocyanurate foam article covers 90% or more of the exposed portion of the wood-based material, has a thickness greater than 1.8 centimeters, a foam core having a density of 28-128 kg/m$^3$, a trimer concentration characterized by at
(Continued)

least one of (i) a trimer level in a range of 12-25 weight-percent and (ii) a molar ratio of trimer to sum of urethane and urea in a range of 1-8, a phosphorous concentration of at least 0.3 wt %, a combined concentration of phosphorous and bromine of at least 0.5 wt %, and a vapor permeable and non-combustible facer on at least one primary surface of the foam core.

8 Claims, 3 Drawing Sheets

(51) Int. Cl.
| | |
|---|---|
| B32B 5/18 | (2006.01) |
| B32B 5/24 | (2006.01) |
| B32B 7/08 | (2019.01) |
| B32B 7/12 | (2006.01) |
| B32B 21/02 | (2006.01) |
| B32B 21/14 | (2006.01) |
| B32B 27/18 | (2006.01) |

(52) U.S. Cl.
CPC .............. *B32B 7/08* (2013.01); *B32B 7/12* (2013.01); *B32B 21/02* (2013.01); *B32B 21/14* (2013.01); *B32B 27/18* (2013.01); *B32B 2260/021* (2013.01); *B32B 2262/101* (2013.01); *B32B 2266/0278* (2013.01); *B32B 2307/3065* (2013.01); *B32B 2307/724* (2013.01); *B32B 2307/732* (2013.01); *B32B 2419/00* (2013.01)

(56) References Cited

U.S. PATENT DOCUMENTS

| | | | |
|---|---|---|---|
| 5,312,848 A | 5/1994 | Klapper et al. | |
| 8,458,971 B2 | 6/2013 | Winterowd et al. | |
| 2007/0178793 A1* | 8/2007 | Gerello | .............. B32B 21/02 |
| | | | 442/394 |
| 2008/0203348 A1 | 8/2008 | Laoutid et al. | |
| 2012/0009428 A1* | 1/2012 | Geels | .............. B32B 27/40 |
| | | | 428/422.8 |
| 2017/0037615 A1* | 2/2017 | Grisolia | .............. E04C 2/386 |
| 2017/0321418 A1* | 11/2017 | Tremblay | .............. E04C 3/122 |

FOREIGN PATENT DOCUMENTS

| | | |
|---|---|---|
| JP | 2007332745 A | 12/2007 |
| WO | 2015/161024 A1 | 10/2015 |

OTHER PUBLICATIONS

Giuseppe Vairo et al, Enhanced Polyisocyanurate Foams for Metal Faced Panels, Polyurethanes, Polyurethanes Technical Conference, 2010, pp. 360-369, Curran Associates, Red Hook USA.

* cited by examiner

WOOD-BASED MATERIAL INSULATED FOR COMBUSTION RESISTANCE

BACKGROUND OF THE INVENTION

Field of the Invention

The present invention relates to an article comprising a wood-based material covered with a particular polyisocyanurate foam article to enhance fire resistance. One such fire retardant article is an I-joist with the wood-based material serving as the web of the I-joist.

Introduction

Wood-based materials are common structural components in buildings. Wood-based materials such as oriented strand board (OSB), plywood and particle board are routinely used as wall sheathing, subflooring, roof decking, and a multitude of other building structure elements. One particular use of wood-based materials is as the web of wood-based I-joists. Wood based I-joists have become increasingly popular in the construction industry. Wood-based I-joists have a wood-based material serving as a web spanning the length of the I-joist. The web has opposing top and bottom edges to which are attached top and bottom flanges, respectively. The flanges provide bend strength to the web and entire I-joist. Typically, the flanges are selected from laminated veneer lumber (LVL) or solid sawn lumber.

Wood-based materials are subject to igniting (combustion) as temperatures reach 190-260 degrees Celsius (° C.), which is a concern in building applications. As a result, building codes typically require building components to meet certain fire retardancy requirements to enhance the safety of building occupants. There is a desire to increase the flame retardancy of wood-based materials so that they can continue their popular use in the building industry while at the same time meeting flame retardancy requirements for building components. In particular, it is desirable to protect the surface of wood-based materials from reaching combustion temperatures (temperatures above 200° C.) for extended periods of time to increase the flame retardancy of the wood-based material.

One approach to increasing flame retardancy of wood-based materials is to coat them with an intumescent coating. Intumescent coatings expand into a cellular structure (a foam) and form a protective foamed char over a substrate that they coat when exposed to excessive heat. U.S. Pat. No. 8,458,971 discloses use of intumescent coating on an engineered wood-based I-joist to help increase fire retardancy of the I-joist. An I-joist product comprising an intumescent coating is available under the trade name Flak Jacket™ (Flak Jacket is a trademark of Weyerhaeuser NR Company). The intumescent coating is a two-part polyurethane formulation that requires careful mixing and application that is not suitable for on-site applications. The coating further comprises such a high level of graphite filler that it is difficult to get a uniform coating over the I-joist.

Application of gypsum board or another form of layered gypsum coating over a wood-based material is another means to increase the flame retardancy of the wood-based material. However, while the gypsum provides increased flame retardancy, it also provides an extensive increase in weight and increased difficulty in machining (cutting, drilling or otherwise shaping) of the wood-based material. Increased weight and decreased machinability are undesirable results of applying a layered gypsum.

Application of mineral wool insulation or ceramic fiber blanket layers to a wood-based material is also a method for increasing the fire retardancy of the wood-based material. However, mineral wool insulation and ceramic fiber blankets are not weather resistant and can readily degrade if exposed to rain, snow or other forms of moisture. Also, like gypsum, mineral wool insulation and ceramic fiber blankets reduce the machinability of a wood-based material. For these reasons, application of mineral wool insulation or ceramic fiber blanket layers is not ideal as flame retardant coatings over wood-based materials.

A need exists for a solution that protects the surface of a wood-based material from reaching combustion temperatures of 200° C. or higher when exposed to a heat source, yet a solution that avoids the drawbacks of intumescent coatings, gypsum material, mineral wool and ceramic fiber blankets. That is, there is a need for a way to increase the fire retardancy of a wood-based material by thermally insulating the surface of the wood material from a heat source and yet that is convenient to both ship as part of a wood-based material and to apply to a wood-based material on a job site, is weather resistant and does not inhibit the machinability of the wood-based material it is protecting.

BRIEF SUMMARY OF THE INVENTION

The present invention provides a solution to the problem of protecting the surface of a wood-based material from reaching combustion temperatures of 200° C. or higher when exposed to a heat source, yet a solution that avoids the drawbacks of intumescent coatings, gypsum material, mineral wool and ceramic fiber blankets. The present invention provides a solution to increasing the fire retardancy of a wood-based material by thermally insulating the surface of the wood-based material from a heat source and yet the wood-based material and solution are convenient to both ship as part of a wood-based material and, as an alternative, to apply to a wood-based material on a job site, is weather resistant and does not inhibit the machinability of the wood-based material it is protecting.

The article of the present invention is a result of discovering a surprising and unexpected way to protect the surface of a wood-based article from reaching combustion temperatures under heating rates that are even more extreme that that required in ASTM E119 testing. A surprisingly enabling feature of the present invention is use of a particular polyisocyanurate foam article attached to and covering the surface of the wood-based article. The polyisocyanurate foam article as defined herein for the article of the present invention insulates a surface over which it resides sufficiently to prevent that surface from heating from 100° C. to 200° C. in less than 100 seconds in the Extreme Oven Test (described herein, below). The temperature range of 100-200° C. is critical because it is the temperature above that which cooling water has been removed and into the temperature range at which wood combustion is reported to occur (190-260° C.). Applicants have found that Extreme Oven Test results in a higher rate of temperature rise between 100-200° C. through a polyisocyanurate foam article than the ASTM E119 test, indicating that it is a more stringent and demanding test for insulative protection of a wood-based article surface than the ASTM E119 test over this critical temperature range. Applicants further provide data in the Examples section that suggest that articles of the present invention in the form of I-joist web of an I-joist enable the I-joist to pass ASTM E119 testing to achieve an A4.4.1 rating.

Surprisingly, not any polyisocyanurate foam article suitable protects a wood-based material so as to prevent the surface over which the foam article resides from heating from 100° C. to 200° C. in less than 100 seconds in the Extreme Oven Test. In particular, it was discovered that the facer of the thermally insulating polyisocyanurate foam article must be non-combustible and must be vapor permeable to achieve this desired result. Polyisocyanurate foam articles having a vapor impermeable facer will not provide the requisite heat protection because the facer tends to delaminate and fall away as cell gas rapidly escapes during heating and essentially pushed off the facer as it escapes from the foam. When the facer delaminates and falls away it leaves the foam exposed without protection from the facer, resulting in decomposition of foam integrity and rapid heating of the protected wood-based material over which the foam resides. Similarly, combustible facers burn away and leave the foam core exposed and subject to decomposition resulting in rapid heating of the protected wood-based material.

Polyisocyanurate foam articles comprising non-combustible vapor impermeable facers covering the opposing primary surfaces are known. Vapor impermeable facers are desirable in thermally insulating foam to trap thermally insulating cell gas (typically residual blowing agent) inside the foam in order to maintain high thermally insulating properties.

It has surprisingly been discovered as part of the present invention that a vapor permeable facer on an otherwise thermally insulating polyisocyanurate foam article achieves better flame retardant properties to a wood-based material over which the foam is applied than a vapor impermeable facer. Polyisocyanurate foam articles having a vapor impermeable facer will not provide the requisite heat protection because the facer tends to delaminate and fall away as cell gas rapidly escapes during heating thereby leaving the foam exposed without protection from the facer, which results in rapid heating of the protected wood-based substrate over which the foam resides.

In a first aspect, the present invention is an article comprising: (i) a wood-based material having a primary surface with an exposed portion; and (ii) a polyisocyanurate foam article attached to the wood-based material using one or more than one attachment means selected from mechanical fasteners and adhesives, the attachment means having less than 10 weight-percent mass loss when heated from 23° C. to 300° C. using a 10° C./minute heating rate under a nitrogen atmosphere as measured by thermal gravimetric analysis, wherein the polyisocyanurate foam article: (a) covers 90% or more of the exposed portion of a primary surface of the wood-based material; (b) has a thickness of greater than 1.8 centimeters; (c) comprises a polyisocyanurate foam core that has a density of 24-128 kilograms per cubic meters as determined according to ASTM method E1730-15; a trimer concentration characterized by a trimer level in a range of 12-25 weight-percent and/or a molar ratio of trimer to sum of urethane and urea in a range of 1-8 as determined by $^{13}C$ NMR; a phosphorous concentration of 0.3 wt % or more; and a combined concentration of bromine and phosphorous that is at least 0.5 weight-percent where weight-percent is measured relative to total polyisocyanurate foam core weight using X-ray fluorescence in accordance with ASTM method D6247-10; (d) comprises facer is a non-combustible, vapor permeable facer adhered to and covering a surface of the polyisocyanurate foam core; and wherein, the polyisocyanurate foam article is attached to the wood-based material with the facer on a surface of the polyisocyanurate foam core that is on an opposite side from the polyisocyanurate foam article surface most proximate to the wood-based material surface it is covering and the article is free of layered gypsum material and cement.

The present invention is useful in construction applications as, for example, sheathing, flooring and a web for wood-based I-joists.

DETAILED DESCRIPTION OF THE INVENTION

Figure 1:
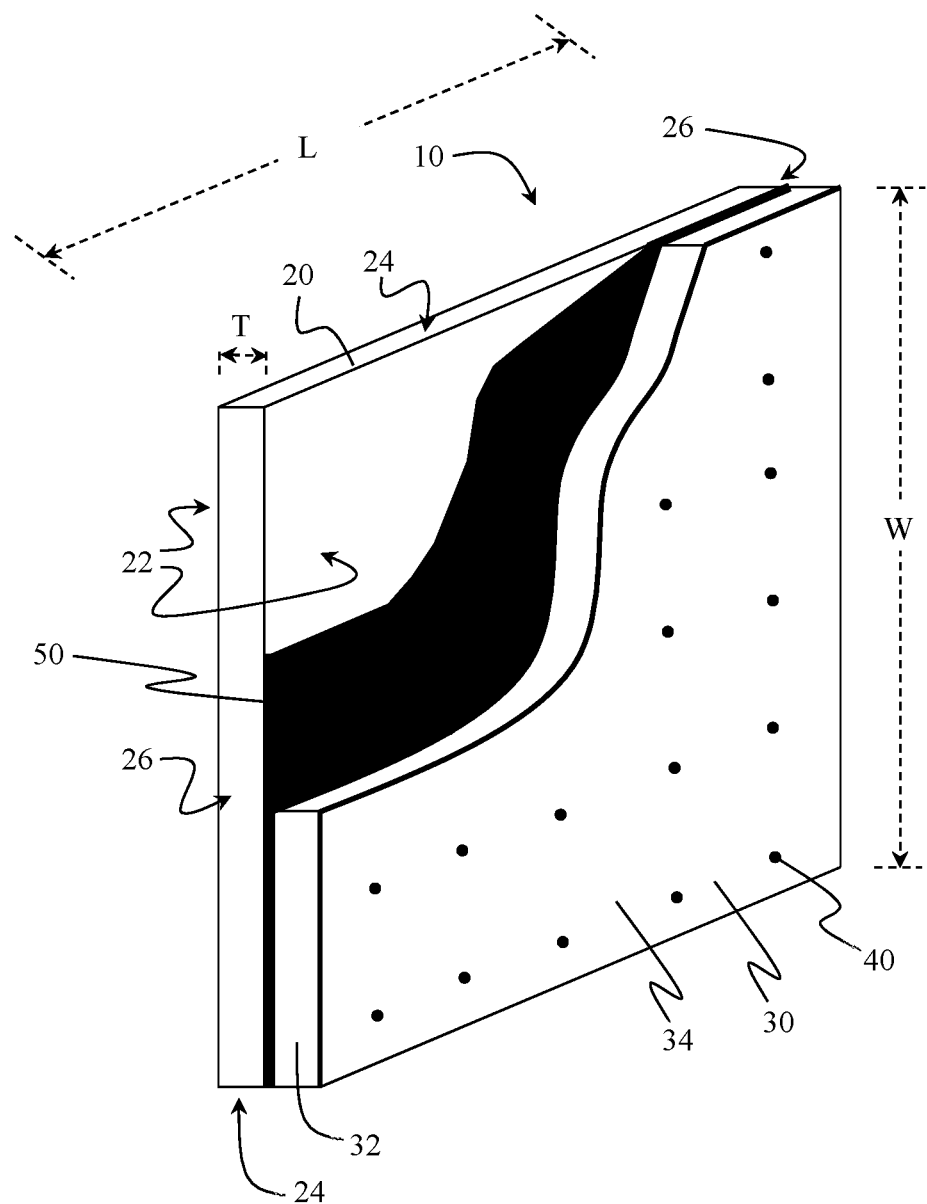
FIG. 1 illustrates a general fire retardant article of the present invention in a cut-away perspective view to facilitate understanding of the different possible elements of the invention.

Test methods refer to the most recent test method as of the priority date of this document if a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standardization.

"Multiple" means two or more. "And/or" means "and, or as an alternative". All ranges include endpoints unless otherwise indicated.

Articles have mutually perpendicular length, width and thickness dimensions. The "length" extends in the longest dimension of the article. The thickness extends in the shortest dimension of the article perpendicular to the length.

"Board" refers to a rectangular article characterized by having opposing primary surfaces defined by the article's length and width dimensions and wherein the thickness is smaller than the length or width, generally as much as an order of magnitude smaller than the length and/or width. The wood-based material of the present invention is desirably a "board". The polyisocyanurate foam core and/or article is also or alternatively desirably a "board".

A "primary surface" of an article is the surface of the article having the largest planar surface area. Planar surface area refers to the surface area of the surface as project onto a plane so as to eliminate peaks and depressions in the surface. Typically, the primary surface is defined by the length and width of an article. Often, an article will have two primary surfaces opposite one another. For example, boards have opposing primary surfaces. Boards also have edges and ends.

"Edges" are surfaces defined by the length and thickness of an article. "Ends" are surfaces defined by the width and thickness of an article.

The present invention comprises a wood-based material. A material is "wood-based" if 50 weight-percent (wt %) or more, preferably 75 wt % or more and can be 80 wt % or more, 90 wt % or more or 100 wt % of the material is wood fiber with wt % based on weight of the material. Examples of wood-based materials include oriented strand board (OSB), plywood, particle board, dimensional lumber, wood/plastic composite boards and laminated veneer lumber boards. The wood-based material can be a component of a more complex article (such as an I-joist).

The wood-based material has a primary surface. If the wood-based material is a board then it has opposing primary surfaces. The primary surface of the wood-based material has an "exposed portion" that would be exposed if were not for the polyisocyanurate foam article attached to it as described below. For example, an OSB board by itself has fully exposed primary surfaces. However, when an OSB board has flanges running along one or more of its edges and the flange extends even partially over a primary surface (as in a web of an I-Joist structure) then only the portion of the OSB board that is not covered by the flange would be exposed portion of the primary surface. In the present invention, generally greater than 50 percent (%) of a primary surface constitutes an exposed portion of the primary surface and it can be that 100% of the primary surface is an exposed portion of the primary surface.

The present invention comprises a polyisocyanurate foam article attached to the wood-based material using one or any combination of more than one attachment means. Suitable attachment means include mechanical fasteners and adhesives. Examples of suitable mechanical fasteners include metal screws, nails and staples. The metal is desirably steel, aluminum, or some other metal that meets the stated weight-loss requirement for the attachment means. Examples of suitable adhesives include one or more than one selected from a group consisting of one- and two-part polyurethane, epoxy, isocyanurate and silicone adhesives having the state weight-loss performance. The attachment means desirably have less than 10 weight-percent mass loss when heated from 23° C. to 300° C. using a 10° C./minute heating rate under a nitrogen atmosphere as measured by thermal gravimetric analysis. Such a weight-loss requirement is desirable to prevent the attachment means from degrading under heat to an extent that the polyisocyanurate foam detaches from the wood-based material when exposed to heat.

Desirably, when adhesive is used to attach the polyisocyanurate foam article to the wood-based material, adhesive resides around the perimeter of the polyisocyanurate foam article surface that attaches to the wood-based material. That is, it is desirable for adhesive to reside around the edges (perimeter) of the surface adhered to the wood-based materials. Adhesive may reside elsewhere as well on the surface of the polyisocyanurate foam, but desirably resides around the perimeter of the adhered surface. It is desirable to have adhesive around the perimeter to reduce the likelihood of separation by, for example, curling of the edges of the polyisocyanurate foam article from the wood-based material when exposed to heat, thereby exposing the wood-based material.

The polyisocyanurate foam article covers essentially all of a primary surface of at least one primary surface of the wood-based material. Covering "essentially all of" an exposed primary surface means covering 90% or more, preferably 95% or more and still more preferably 100% of the surface area of an exposed primary surface. When the wood-based material is a board, the polyisocyanurate foam article can cover essentially all of one or both opposing primary surfaces of the wood-based material.

The polyisocyanurate foam article comprises a polyisocyanurate foam core. Preferably, the polyisocyanurate foam core is a foam board having opposing primary surfaces.

The polyisocyanurate foam core and/or the entire polyisocyanurate foam article desirably has a thickness of 1.8 centimeters (cm) or more, preferably 1.9 cm or more, 2.0 cm or more and can be 2.54 cm or more, 3.0 cm or more, 4.0 cm or more, even 5.0 cm or more while at the same time is generally 10 cm or less, 8.0 cm or less, 7.0 cm or less, 6.0 cm or less, 5.0 cm or less, and can be 4.0 cm or less, 3.5 cm or less, 3.0 cm or less, or even 2.5 cm or less. Determine thickness of the polyisocyanurate foam and foam core according to ASTM method E1730-15.

It is desirable for the polyisocyanurate foam core to have a density of 24 kilograms per cubic meter ($kg/m^3$) or more, preferably 28 $kg/m^3$ or more while at the same time to have a density of 128 $kg/m^3$ or less, preferably 80 $kg/m^3$ or less. Determine foam density according to ASTM method E1730-15.

It is important for the polyisocyanurate foam core to have a certain trimer concentration. Trimer concentration is important to achieve structural integrity in the polyisocyanurate foam core at elevated temperatures experienced by the foam core in a fire situation. The trimer concentration can be characterized by either: (i) a trimer level (also known as "trimer content", "percent trimer" or "% trimer"); or (ii) a molar ratio of trimer to the sum urethane and urea in the foam core. Trimer level is easiest to determine from the reactants used to prepare the foam core. The molar ratio of trimer to the sum urethane and urea in the foam core is the easier value to determine from a foam core. The polyisocyanurate foam core has either a specific trimer level, a specific molar ratio of trimer to the sum urethane and urea, or both. The values for each of these characteristics and methods for determining them are as follows.

Desirably, the polyisocyanurate foam core has a trimer level of 12 wt % or more, preferably 14 wt % or more and at the same time 25 wt % or less, preferably 20 wt % or less with wt % relative to total polyisocyanurate foam core weight. Trimer level is a measure of trimer linkages in a polyisocyanurate foam. Trimer linkages are a series of three linkages between isocyanate moieties that form a ring (isocyanurate). Trimer level is the wt % of trimer moieties relative to total polymer weight in the foam. Trimer level can be calculated for a polyisocyanurate foam from its starting materials by dividing the difference between the number of isocyanate equivalents and isocyanate reactive equivalents in the starting materials by the sum of the masses for the isocyanate starting materials and mass of isocyanate reactive starting materials, then multiplying that ratio by 42 and then multiplying that by 100.

Alternatively, or additionally, the polyisocyanurate foam core desirably has a molar ratio of trimer to sum of urethane and urea of one or more, preferably 2 or more, still more preferably 3 or more and can be 4 or more and even 5 or more while at the same time is desirably eight or less, typically 7 or less, 6 or less, 5 or less or even 4 or less. Determine this molar ratio using carbon-13 nuclear magnetic resonance spectroscopy ($^{13}C$ NMR). The NMR peak for the sum of urethane and urea carbonyl is at 153 ppm and the peak for isocyanurate is at 149 ppm. The ratio of the 149 ppm peak area to the 153 ppm peak area provides the molar ratio of trimer to sum of urethane and urea. The method is described in Clift, S. M., J. Grimmiger, and K. Muha, "New Polyisocyanurate Catalysts for Rigid Polyurethane Foams," SPI Conference. 1994.

The polyisocyanurate foam article, typically the polyisocyanurate foam core, contains fire retarding components that contain phosphorous (P) and bromine (Br). The P and Br can be on the same component or different components. The amount of the fire retarding component is sufficient to provide a P concentration of 0.3 wt % or more, preferably 0.5 wt % or more and typically even more preferably 0.6 wt % or more while at the same time is typically 2.5 wt % or less, preferably 2.0 wt % or less and more preferably 1.8 wt % or less. At the same time, the fire retarding components provide a combined concentration of Br and P that is 0.5 wt % or more, preferably one wt % or more, yet more preferably 1.5 wt % or more and at the same time is generally 6 wt % or less, preferably 4 wt % or less. Wt % of P and Br is relative to total polyisocyanurate foam core weight. Determine wt % of P and Br by X-ray fluorescence in accordance with ASTM method D6247-10.

The polyisocyanurate foam core has a facer adhered to and covering at least one surface, preferably primary surface, of the polyisocyanurate foam core. When the polyisocyanurate foam core is a board, it can have facers covering one or both opposing primary surface. When the polyisocyanurate foam core has facers over both opposing primary surfaces, the facers can be the same or different. Facers used over the primary surface or surfaces of the foam core are non-combustible and vapor permeable. The facer can be adhered to the polyisocyanurate foam core using an adhesive as described for the attachment means above. Preferably, the foam core is prepared directly on the facer and/or the facer is applied to the foam core as it is being prepared so that the facer is inherently adhered to the foam core by adhesion directly with the foam core.

A facer is considered "non-combustible" if it qualifies as "non-combustible" according to ASTM E-136 testing. Examples of suitable non-combustible facers include those made of aluminum, glass (such as glass fiber), clay impregnated glass, and steel.

A facer is considered "vapor permeable" if it achieves a permeance value of at least 0.35 nanograms per second per square meter per pascal (that is, 20 US perm (grain of water vapor per hour per square foot per inch of mercury)) in the water vapor permeability test ASTM E96 Method B using a 150.5 square centimeter test area size. The facers of the present polyisocyanurate foam article contrasts that of conventional thermally insulating polyisocyanurate foam articles by at least the fact the present facers are vapor permeable. Traditionally, facers on thermally insulating polyisocyanurate foam articles are intentionally not vapor permeable because the desire is to inhibit thermally insulating gas located in the cells of the polyisocyanurate foam core from escaping, thereby lowering the thermally insulating properties of the foam article. However, it is surprisingly discovered with this invention that it is necessary to allow vapors to escape from the polyisocyanurate foam core when the foam article is heated in order to avoid bubbling and delamination of the facers from the polyisocyanurate foam core, which can result in reduced fire retardancy of the foam article as well as delamination of the foam core and/or article from the wood-based material to which it is adhered.

Desirably, the facer is perforated aluminum sheet having a thickness of 22.9 micrometers (0.9 mils) or more and can be 25.4 micrometers (one mil) or more, 31.8 micrometers (1.25 mils) or more and can be 50.8 micrometers (two mils) or more and even 76.2 micrometers (three mils) or more while at the same time is generally 1.5 millimeters or less, preferably one millimeter or less, more preferably 0.5 millimeters or less and can be 0.1 millimeters (four mills) or less. The facer can be a combination of glass fibers and aluminum sheet where the glass fibers are adhered to one or both primary surfaces of the aluminum sheet.

The facers can be woven or nonwoven materials or solid materials that have holes (perforations for example) through them in order to achieve the vapor permeability characteristics. It is desirable for the facer to be a solid sheet of material, preferably a metal sheet and even more preferably a reflective metal sheet such as aluminum as described above, but with holes defined in the sheet so as to achieve the requisite vapor permeability. When the facer has holes defined through it, the holes are desirably present at an average number of holes per square centimeter of facer (hole density) that is 0.1 or more, preferably 0.5 or more, and can be 1.0 or more, 1.5 or more, 2.0 or more, 2.5 or more and at the same time is generally 5.0 or fewer and can be 4.5 or fewer, 4.0 or fewer, 3.5 or fewer, even 3.0 or fewer holes per square centimeter of facer primary surface. Determine hole density by counting the number of holes in a randomly selected area of 0.1 square meter. At the same time, or independently, it is desirable for the holes to have an average hole size of 0.5 millimeters (mm) or greater, 1.0 mm or greater, 1.5 mm or greater and can be 2.0 mm or greater while at the same time is desirably 3.0 mm or smaller, and can be 2.5 mm or smaller, 2.0 mm or smaller and even 1.5 mm or smaller. Hole size refers to the average of the largest and smallest dimension of a hole. Determine average hole size by measuring the hole size for a random selection of 20 holes and taking the average of those 20 hole sizes. Measure the hole size by, for example, optical microscopy.

The polyisocyanurate foam article is attached to the wood-based material with a surface, preferably a primary surface, of the polyisocyanurate foam core proximate to the wood-based material and an opposing surface, preferably a primary surface, of the polyisocyanurate foam core that is covered with a facer as described remote from the wood-based material. When the polyisocyanurate foam core is a board, opposing primary surfaces of the polyisocyanurate foam core are generally parallel to the an exposed primary surface of the wood-based material with one primary surface of the polyisocyanurate foam core attached directly or indirectly (for example, via a facer, glass mat or both) to the primary surface of the wood-based material. A facer of the polyisocyanurate foam article covers the surface of the foam core that is remote from the wood-based material. Preferably, there is a facer covering both primary surfaces of the polyisocyanurate foam core when it is a board.

As previously mentioned, attachment means attach the polyisocyanurate foam article to the wood-based material. For example, an adhesive attachment means can affix a polyisocyanurate foam core or a facer of a polyisocyanurate foam article to an exposed portion of the wood-based material's primary surface. As another example, a polyisocyanurate foam article can be screwed and/or nailed and/or stapled to the exposed portion of the wood-based material's primary surface with or without an adhesive attachment means between the polyisocyanurate foam core (or facer of a polyisocyanurate foam article) and the wood-based material's primary surface. Article 10 of FIG. 1 illustrates examples of both mechanical fasteners (40) and adhesive (50), but both are not necessary and an article can comprise both or only one or the other.

If more than one polyisocyanurate foam article is required to cover the exposed portion of a surface of a wood-based material, multiple polyisocyanurate foam articles can be applied to the exposed portion of the wood-based material surface. When multiple polyisocyanurate foam articles are used to cover a surface they can be butted together, or joined with any other kind of continuous joint such as a lap joint, finger joint, or tongue-and-groove joint. When polyisocyanurate foam articles are on both opposing surfaces of a wood-based material and more than one foam article is on each side mated or joined with a joint (for example, a butt joint), it is desirable that the joints on the opposing sides of the wood-based material are staggered—that is, they do not align with one another.

The polyisocyanurate foam article can comprise glass fibers. Glass fibers are desirable as non-combustible components that provide mechanical integrity to the polyisocyanurate foam article even in the event that other components of the polyisocyanurate foam article char. Glass fiber can be associated with the polyisocyanurate foam core and/or one or both facer. The glass fibers serve to reinforce the polyisocyanurate foam core from crumbling when heated to a point when the polyisocyanurate foam core thermally degrades and/or decomposes. By "associated with the polyisocyanurate foam core and/or one or both facer" it is meant that glass fibers can be in any one or any combination of more than one of the following locations: (i) dispersed within the polyisocyanurate foam core; (ii) sandwiched between the polyisocyanurate foam core and facer on one or both primary surfaces of the polyisocyanurate foam core; (iii) dispersed within one or both facers; and (iv) as one or both facer. Glass fibers can be exclusively in any one of locations (i)-(iv) or in any combination of more than one of locations (i)-(iv).

Glass fibers are desirably present in the polyisocyanurate foam article at a loading of 2 wt % or more, preferably 4 wt % or more and can be 6 wt % or more, 8 wt % or more, 10 wt % or more, 12 wt % or more and even 14 wt % or more while at the same time 15 wt % or less and can be 13 wt % or less, 11 wt % or less 9 wt % or less, 7 wt % or less, 5 wt % or less or even 3 wt % or less based on total polyisocyanurate foam core weight.

It is desirable for the glass fibers to be located across as much of the polyisocyanurate foam core as possible. That is, it is desirable that any cross section of the polyisocyanurate foam article taken perpendicular to a primary face of the foam core contains glass fibers and, even more desirably, approximately the same amount of glass fibers as any other cross section taken perpendicular to a primary face of the foam core.

The vapor permeable facer on one or both primary surfaces of the polyisocyanurate foam core can comprise glass fibers. In fact, either or both facer can contain more than 50 volume-percent (vol %), 75 vol % or more, 80 vol % or more, 90 vol % or more and even 95 vol % or more glass fiber based on total facer volume. For example, a vapor permeable facer can be a non-woven mat of glass fibers with or without binder. Such a facer desirably has a thickness of 0.38-1.64 millimeters. Typically, such a non-woven mat includes a binder that holds the glass fibers together. The non-woven mat of glass fibers can include an inorganic and/or organic polymeric binder.

FIG. 1 provides a cut-away illustration of an example of an article of the present invention. FIG. 1 illustrates article 10 comprising wood-based material 20, which is a board having opposing primary surfaces 22, length L, width W and thickness T. Article 10 further comprises polyisocyanurate foam article 30 covering only one primary surface 22 of the wood-based material. Wood-based material 20 has opposing edges 24 and opposing ends 26. FIG. 1 shows a cut-away view where a portion of the polyisocyanurate foam article and adhesive attaching the polyisocyanurate foam article to the wood-based material is not shown in order to provide better view of the article components. Polyisocyanurate foam article 30 comprises polyisocyanurate foam core 32, facer 34 on a surface of the foam core remote from wood-based material 20. The polyisocyanurate foam article is attached to the wood-based material using mechanical fasteners (screws) 40 and adhesives 50. Both mechanical fasteners and adhesive is used in article 10 of FIG. 1 for illustrative purposes, however both are not required and only or the other can be used in an article of the present invention.

A particularly desirable article of the present invention is an I-joist article where the wood-based material serves as the web of the I-joist. Wood-based I-joists typically comprise a wood-based web material in the form of a board with flanges attached to and extending along both opposing edges of the wood-based web material.

The top and bottom flanges of the I-joist are desirably wood-based but can be any organic or inorganic composition. Typically, the top and bottom flanges are selected from laminated veneer lumber (LVL) or solid sawn lumber. The top and bottom flanges typically have generally rectangular profiles as viewed perpendicular to the length and thickness of the flange. "Generally rectangular" means all inside angles are within ten degrees of right angles. The top and bottom flanges are attached to the web of the I-joist. For example, the web can extend into a groove in the top and/or bottom flange to facilitate attachment or stability, as illustrated for top flange 120 in FIG. 2. Alternatively, the top and/or bottom flange can comprise two separate pieces of material that sandwich the web proximate to, preferably at, the edge of the web as illustrated for bottom flange 130 in FIG. 2.

Figure 2:
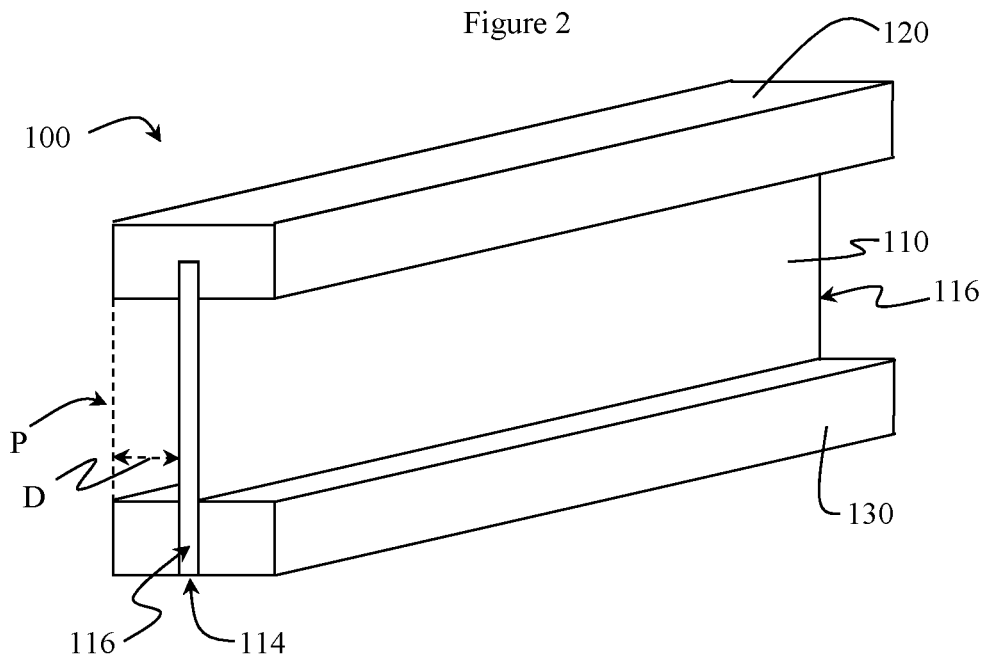
FIG. 2 illustrates perspective views of an I-joist.

FIG. 2 illustrates an exemplary article of the present invention in the form of an I-joist. I-joist 100 has wood-based web 110 with opposing primary surfaces 112, opposing edges 114 and opposing ends 116. Wood-based web can be, for example, orients strand board (OSB), solid wood board, plywood, or any other wood-based material. Extending along opposing edges 114 and attached to web 110 are top and bottom flanges (120 and 130 respectively) that extend beyond primary surfaces of the web in the thickness dimension of web 110 while leaving a portion of each opposing surface 112 of the web 110 exposed to serve as opposing exposed portions of primary surfaces for wood-based web 110. Top flange 120 and/or bottom flange 130 can be a single piece attached to web 110 as illustrated for top flange 120 or either one or both flanges can be multiple pieces attached to web 110 as is illustrated for bottom flange 130.

Figure 3:
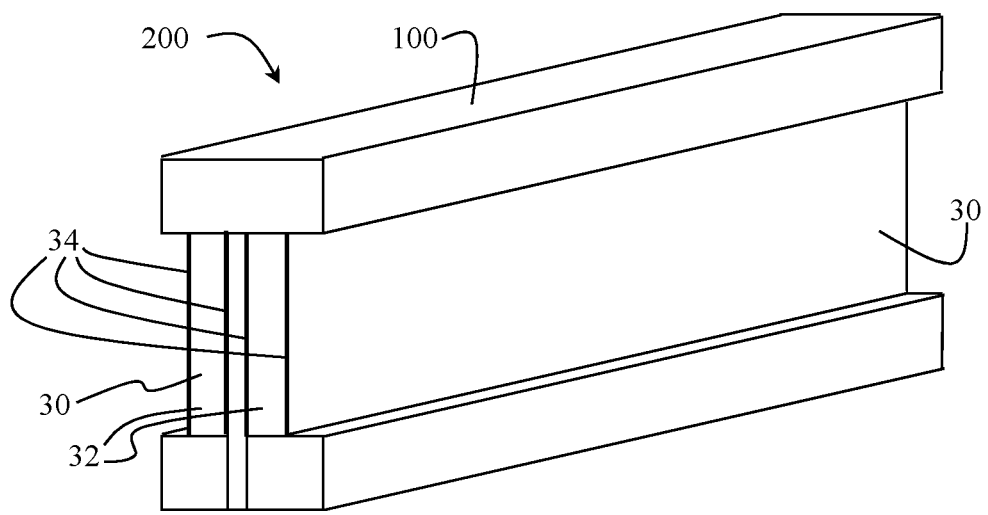
FIG. 3 illustrates perspective views of an I-joist article of the present invention that comprises the I-joist of FIG. 2.

When the article of the present invention is in the form of an I-joist, the article comprises a polyisocyanurate foam article covering 90% or more, preferably 95% or more and still more preferably 100% of the exposed primary surface area of one or, preferably, both primary surfaces of the I-joist web. FIG. 3 illustrates an example of an I-joist article 200 of the present invention comprising I-joist 100 of FIG. 1. I-joist article 200 comprises wood-based material as web 110 and polyisocyanurate foam articles 30 (as described for FIG. 1) adhered to and essentially covering the both exposed primary surfaces of primary surfaces 112 by means of adhesive 50 (not shown). Polyisocyanurate foam articles 30 comprise polyisocyanurate foam core 32, facers 34 covering opposing primary surfaces of polyisocyanurate foam core 32 and glass fibers 36 (not shown) dispersed throughout polyisocyanurate foam core 32.

In an I-Joist article of the present invention, it is particularly desirable for the polyisocyanurate foam article to have a maximum thickness equal to or less than the perpendicular distance from the exposed primary surface of the web to a plane extending from outer edges of the top and bottom flanges on the same side as the primary surface of the web so that the foam does not extend from the web beyond the top or bottom flange. To ensure clarity to this desirable maximum dimension, FIG. 2 illustrates the perpendicular distance ("D") from the exposed primary surface of the web 110 to a plane ("P") extending from outer edges of the top and bottom flanges on the same side as the primary surface of the web 110. The polyisocyanurate foam article 30 desirably has a thickness equivalent to D or less.

Surprisingly, I-joist articles of the present invention achieve a time to structural failure in the ASTM E119 (Standard Test Methods for Fire Tests of Building Construction and Materials) testing with 50% rated load that is 15 minutes and 30 seconds or longer, which is required to achieve the stringent A4.4.1 standard fire protection classification. Moreover, the I-joist article of the present invention can achieve this result without intumescent coatings, mineral wool or layered gypsum materials. In that regard, the present article can be free of any one or combination of more than one of the following fire retarding materials: intumescent coatings, mineral wool and layered gypsum materials. Layered gypsum materials are coatings of gypsum such as, for example, gypsum board and/or a gypsum plaster coating.

EXAMPLES

Pairs of polyisocyanurate foam articles were prepared and evaluated for how well they insulated during extreme heating using the Extreme Oven Test. During the Extreme Oven Test the temperature rise is monitored on one side a polyisocyanurate foam article when the opposing side is exposed to heat to determine the time for the temperature go from 100° C. to 200° C.

Extreme Oven Test

Cut out two circular pieces, each having a 120 millimeter diameter, from a board of a subject polyisocyanurate foam article. Apply approximately two grams of a one-component polyurethane adhesive (available as Mor-Ad™ 656 laminating adhesive, Mor-Ad is a trademark of Rohm and Haas Chemicals LLC) to one primary surface of the first of the two pieces as a bead around the perimeter of the piece about 1.7 centimeters in from the outer edge of the piece but leave a small gap in the perimeter to insert a thermocouple. Spray approximately 0.3 grams of water over the adhesive and press a primary surface of the second piece against the adhesive with the edges of polyisocyanurate foam pieces aligned to form a cylindrical laminate. Place a minimum of one kilogram mass onto the cylindrical laminate to press the two pieces together and allow them to cure for at least four hours, preferably 24 hours at 22° C. and 50% relative humidity to form a test sample.

Figure 4:
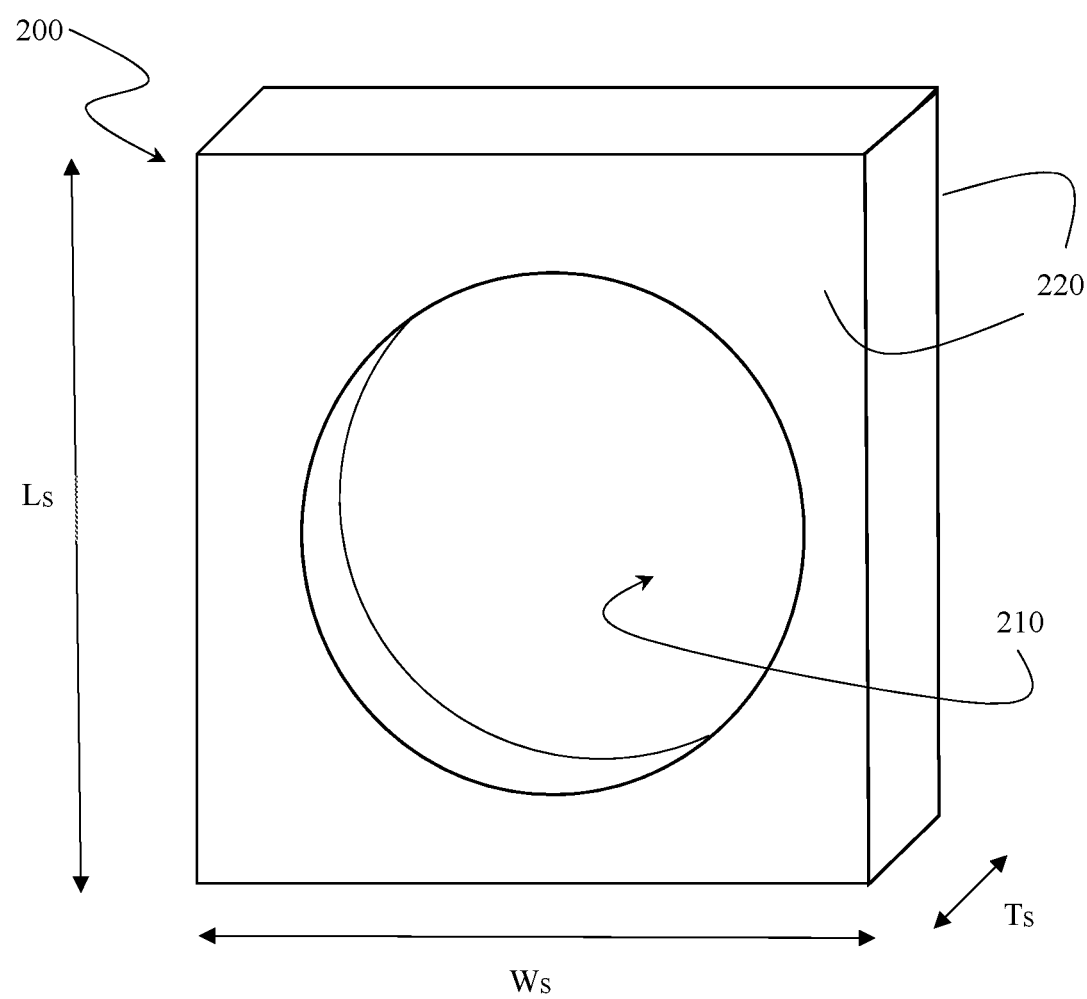
FIG. 4 illustrates the calcium silicate sleeve used in the Extreme Oven Test.

Press the test sample into a quartz ring with a 120 millimeter inside diameter and 130 millimeter outside diameter and with a slot for a thermocouple. Position the test sample so that the slot in the quartz ring and the small gap in the adhesive holding the pieces of test sample together align. Insert a thermocouple through the slot in the quartz ring and between the pieces of the test sample through the gap in the adhesive so that the thermocouple reaches the center of the test sample. Position the test sample in the quartz ring into a calcium silicate sleeve, such as the calcium silicate sleeve shown in FIG. 4. Slide the quartz ring holding the test sample into a circular cutout (210) having an inside diameter of approximately 130 millimeters (5 inches) defined centrally all the way through a calcium silicate sleeve (200), including through the both opposing primary surfaces (220), the calcium silicate sleeve having a thickness (Ts) of 5.1 centimeters (2 inches) and a length (Ls) and width (Ws) that are both 15.2 centimeters (6 inches). Opposing primary surfaces of the test sample should be exposed with the sides of the test sample within the quartz ring and calcium silicate sleeve. The quartz ring holding the test sample should remain securely held within the calcium silicate sleeve.

Place the assembly into an oven at 450° C. and record the temperature readings from the thermocouple. Document the time it takes for the thermocouple to rise from 100° C. to 200° C.

Polyisocyanurate Foam Articles

The following polyisocyanurate foam articles were tested in the Extreme Oven Test. Table 1 identifies the polyisocyanurate foam articles and compares the time required for the temperature of the thermocouple to go from 100° C. to 200° C. in the Extreme Oven Test.

TABLE 1

| Sample | Time (Seconds) |
|---|---|
| Comparative Example (Comp Ex) A - Control A 2.54 centimeter thick polyisocyanurate foam article having a 22.9 micrometer (0.9 mil) thick aluminum facer on both primary surfaces of a polyisocyanurate foam core; a foam core density of 28.8 kg/m³ (1.8 pounds per cubic foot), a trimer level of 17.8%, and a molar ratio of trimer to sum of urethane and urea of 3; a phosphorous concentration of 0.6 wt % and the sum of the concentration of phosphorous and bromine is 3.6 wt %; and glass fiber is dispersed within the foam core at a loading of 5.7 wt % with wt % values relative to polyisocyanurate foam core weight and determined using the methods set forth previously in this application. The polyisocyanurate foam article is commercially available under the tradename THERMAX ™ (THERMAX is a trademark of The Dow Chemical Company) | 84 |
| Comp Ex B This is the same as Comparative Example A except for the following difference: 1.27 centimeter thick polyisocyanurate foam article with perforate the aluminum facer on both primary surfaces of the polyisocyanurate foam article with 0.52 holes per square centimeter of facer surface area with holes that are on average 1.59 millimeters (1/16 inch) in size so as to render the facer vapor permeable. | 91 |
| Comp Ex C This is the same as Comparative Example A except for the following difference: 1.59 centimeter thick polyisocyanurate foam article with 11 US perm clay coated glass mat facers instead of perforate aluminum facers. The clay coated glass mate face is commercially available as HP 1000 WEBTECH ™ Foam Panel Facer (WEBTECH is a trademark of Atlas Roofing Corporation). | 65 |

TABLE 1-continued

| Sample | Time (Seconds) |
|---|---|
| Example (Ex) 1 This is the same as Comparative Example A except perforate the aluminum facer on both primary surfaces of the polyisocyanurate foam article with 0.52 holes per square centimeter of facer surface area with holes that are on average 1.59 millimeters (¹⁄₁₆ inch) in size so as to render the facer vapor permeable. | 143 |
| Example (Ex) 2 This is the same as Example 1 except perforate the aluminum facer on both primary surfaces of the polyisocyanurate foam article with 2.6 holes per square centimeter of facer area | 126 |
| Example (Ex) 3 This is the same as Example 1 except perforate the aluminum facer on both primary surfaces of the polyisocyanurate foam article with 3 mm holes. | 124 |
| Example (Ex) 4 This is the same as Example 1 except each piece polyisocyanurate foam article has the perforated aluminum facer on only its primary surface that is opposite from the primary surface adhered to the other piece of polyisocyanurate foam article (that is, the facer is on the primary surface that is oriented toward the heat in the oven). | 100 |
| Example (Ex) 5 This is the same as Example 1 except with glass fiber is dispersed within the foam core at a loading of 8.0 wt % with wt % values relative to polyisocyanurate foam core weight. | 138 |
| Example (Ex) 6 This is the same as Example 1 except without glass fiber dispersed within the foam core. | 101 |
| Example (Ex) 7 This is the same as Example 1 except with the glass fiber as a mat at a loading of 3 grams per square foot concentrated in the ¼ of the foam thickness that is oriented toward the heat in the oven. | 113 |
| Example (Ex) 8 This is the same as Example 1 except a phosphorous concentration of 1.2 wt % and the sum of the concentration of phosphorous and bromine is 4.4 wt %. | 131 |
| Example (Ex) 9 A 2.54 centimeter thick polyisocyanurate foam article having a 22.9 micrometer (0.9 mil) thick aluminum facer as Example 1 on the first primary surface of a polyisocyanurate foam core; a 76.2 micrometer (3 mil) tri-laminate facer consisting of aluminum foil, Kraft paper and polyethylene terephthalate on the second primary surface; a foam core density of 28 kg/m³ (1.75 pounds per cubic foot), a trimer level of 12%, and a molar ratio of trimer to sum of urethane and urea of 2; a phosphorous concentration of 0.3 wt % and the sum of the concentration of phosphorous and bromine is 0.5 wt %; and glass fiber is dispersed within the foam core at a loading of 2.8 wt % with wt % values relative to polyisocyanurate foam core weight and determined using the methods set forth previously in this application. The first primary surface with the aluminum facer is oriented towards the heat in the oven. | 146 |

I-Joist Articles

Test the following wood-based I-joist articles using a horizontal fire resistance test furnace following ICC-ES AC14 Acceptance Criteria for Prefabricated Wood I-Joists using the fire endurance conditions and standard time-temperature curve described in ASTM E119, Standard Test Methods for Fire Tests of Building Construction and Materials. Two of the possible failure criteria for the I-joist in the test that are of importance for these examples:

(1) Flange Failure. The top and/or bottom flange loses structural integrity and breaks catastrophically.
(2) Web Failure. The web loses integrity and the top flange deflect under the load at a rate greater than 0.1 inches/minute/foot of span.

Polyisocyanurate foam is intended to protect the wood-base web of the I-joist so improvements in fire retardancy of the present invention are evident in a reduction of web failure, either by elimination of web failure or a longer time before experiencing web failure during the test.

Evaluate the I-joists using two I-joists as set forth in the ICC-ES AC14 test method.

Comparative Example—D Polyisocyanurate Foam with Vapor Impermeable Facers

Obtain two wood-based I-joists comprising 3.81 centimeter (cm) by 5.87 cm (1.5 inch by 2⁵⁄₁₆ inch) laminated veneer lumber flanges and 0.95 cm (⅜ inch) thick oriented strand board web. The joists are 4.27 meters (14 feet) in length and 24.1 cm (9.5 inches) in height. Suitable wood-based I-joists are commercially available from Boise Cascade under the tradename BCI™ 60s 2.0 (BCI is a trademark of Boise Cascade).

To the wood-based I-joist, adhere the polyisocyanurate foam article of Comp Ex A. Adhere the polyisocyanurate foam article to the exposed surface area of both sides of the web using and adhesive based on methylene diphenyl diisocyanate (MDI) and a 2000 molecular weight uncapped diolglycol initiated polyether polyol having an hydroxyl number of 56, the adhesive containing seven wt % of a fumed silica (surface area of 200 square meters per gram) that has been surface modified with polydimethylsilane (for example, the adhesive available under the trade name MOR-AD™ M-533, MOR-AD is a trademark of Rohm and Hass Chemicals LLC). Apply the adhesive generally over the exposed primary surface of the web of the I-joist at a loading of 36 grams per square foot of web primary surface in the form of seven beads extending the length of the web with 2.54 centimeter separation between beads. Press the polyisocyanurate foam article against the web with the bead of adhesive between the foam article and web and allow the adhesive to cure for at least three days before testing.

Two pieces of polyisocyanurate foam articles were used on each side of the wood-based I-joist web, one piece being 6 feet in length and the other piece 8 feet in length. The pieces were butted together with the butt joint between polyisocyanurate foam article pieces aligned with one another on the two sides of the I-joist web.

Comparative Example D demonstrated a "Time to Structural Failure" of 15 minutes and 15 seconds with structural failure occurring by means of Web Failure when tested using a two I-joist load of 1090 kilograms (2404 pounds). This time is below the 15 minutes 30 second threshold required to achieve an A4.4.1 standard rating. Notably, a thermocouple between the polyisocyanurate foam article and the wood-based material of the I-Joist web recorded a time of 270 seconds for the temperature to rise from 100° C. to 200° C.

Comp Ex E—Thin Polyisocyanurate Foam with Vapor Permeable Facer

Comp Ex E is similar to Comp Ex D except the polyisocyanurate foam article used is that of Comp Ex B, described above.

Comparative Example E demonstrated a "Time to Structural Failure" of 14 minutes and 30 seconds with structural failure occurring by means of Web Failure when tested using a two I-joist load of 1090 kilograms (2404 pounds). This time is below the 15 minutes 30 second threshold required to achieve an A4.4.1 standard rating. Notably, a thermocouple between the polyisocyanurate foam article and the wood-based material of the I-Joist web recorded a time of 275 seconds for the temperature to rise from 100° C. to 200° C.

Examples 10-12—Polyisocyanurate Foam with Vapor Permeable Facers

Examples 10 and 11 are the same as Comparative Example D except: (a) use Ex 1 as the polyisocyanurate foam article instead of Comp Ex A; and (b) position the 6-foot piece of polyisocyanurate foam article opposite the 8-foot piece of polyisocyanurate foam article on the opposite side of the web so as to achieve non-aligned butt joints between polyisocyanurate foam articles on either side of the web. The polyisocyanurate foam article is the same as that used for Example 1.

Test Example 10 in like manner as Comparative Example D using a 2 I-joist load of 1090 kilograms (2404 pounds). Example 10 demonstrated a "Time to Structural Failure" of 15 minutes and 27 seconds with structural failure occurring by means of Flange Failure. Hence, the vapor permeable facer succeeded in protecting the wood-based material of the web in the I-joist. In contrast, when the same foam was used without a vapor permeable facer the I-joist failed by means of Web Failure (see Comp Ex D) because the wood-based material of the web was not adequately protected from the fire.

Test Example 11 in like manner except with an I-joist load of 962 kilograms (2120 pounds). Example 11 demonstrated a "Time to Structural Failure" of 17 minutes and 10 seconds with structural failure occurring by means of Flange Failure. Hence, the vapor permeable facer again succeeded in protecting the wood-based material of the web in the I-joist. Moreover, the I-joist achieved greater than 15 minutes 30 seconds "Time to Structural Failure", which is needed to achieve the A4.4.1 standard rating.

Example 12 is like Example 11 and tested in like manner as Example 11 except the polyisocyanurate foam article is Example 4 having perforated facer on only one primary surface—the exposed surface remote from the I-joist web. Adhere the primary surface without facer to the web of the I-joist. Example 12 demonstrated a "Time to Structural Failure" of 16 minutes and 40 seconds with structural failure occurring by means of Flange Failure. Hence, the polyisocyanurate foam board having only one vapor permeable facer succeeded in protecting the wood-based material on the web in the I-joist. The I-joist achieved greater than 15 minutes 30 seconds "Time to Structural Failure", which is needed to achieve the A4.4.1 standard rating. Notably, a thermocouple was included in the test structure between the polyisocyanurate foam board and the web of the I-joist to record the temperature rise on the surface of the web. It took 353 seconds for the temperature to rise from 100° C. to 200° C.

Comparison of Extreme Oven Test and ASTM E119 Test Results

The temperature rise on the opposite side of the polyisocyanurate foam article took longer to rise from 100° C. to 200° C. in the ASTM E119 test than in the Extreme Oven Test, indicating that the heating rate was less extreme in the ASTM E119 test. For example, for the polyisocyanurate foam article of Example 12 the temperature rise took 353 seconds in the ASTM E119 test but only 100 seconds in the Extreme Oven Test. For the polyisocyanurate foam article of Comparative Example D, the temperature rise took 270 seconds in the ASTM E119 test and only 84 seconds in the Extreme Oven Test. For the polyisocyanurate foam article of Comparative Example E, the temperature rise took 275 seconds in the ASTM E119 test and 91 seconds in the Extreme Oven Test. Such results suggest the Extreme Oven Test is a more demanding heating test.

Polyisocyanurate foam articles that demonstrated a temperature rise from 100° C. to 200° C. in less than 100 seconds in the Extreme Oven Test did not pass the ASTM E119 testing—that is, demonstrated a Time to Structural Failure that was below that needed to achieve an A4.4.1 standard rating.

In contrast, polyisocyanurate foam articles that demonstrated a temperature rise from 100° C. to 200° C. in 100 seconds or more in the Extreme Oven Test did pass the ASTM E119 testing—that is, demonstrated a Time to Structural Failure that was above that needed to achieve an A4.4.1 standard rating.

These test results suggest that polyisocyanurate foam articles that demonstrated 100 seconds or longer for the 100-200° C. temperature rise in the Extreme Oven Test should protect the web of a wood-based I-Joist sufficiently to pass the ASTM E119 testing when covering the exposed portion of the I-Joist web.

The invention claimed is:
1. An article comprising:
  (i) a wood-based material having a primary surface with an exposed portion;
    wherein the wood-based material has opposing top and bottom edges extending along a length and wherein the article further comprises top and bottom flanges attached to the wood-based material and extending along the top and bottom edges respectively of the wood-based material while leaving a portion of the primary surfaces of the wood-based material exposed as exposed primary surfaces; and (ii) a polyisocyanurate foam article attached to the wood-based material using one or more than one attachment means selected from mechanical fasteners and adhesives, the attachment means having less than 10 weight-percent mass loss when heated from 23° C. to 300° C. using a 10° C./minute heating rate under a nitrogen atmosphere as measured by thermal gravimetric analysis, wherein the polyisocyanurate foam article:

a. covers 90% or more of the exposed portion of a primary surface of the wood-based material;

b. has a thickness of greater than 1.8 centimeters;

c. comprises a polyisocyanurate foam core that has
   a density of 24-128 kilograms per cubic meters as determined according to ASTM method E1730-15;
   a trimer concentration characterized by a trimer level in a range of 12-25 weight-percent and/or a molar ratio of trimer to sum of urethane and urea in a range of 1-8 as determined by 13C NMR;
   a phosphorous concentration of 0.3 wt % or more; and
   a combined concentration of bromine and phosphorous that is at least 0.5 weight-percent where weight-percent is measured relative to total polyisocyanurate foam core weight using X-ray fluorescence in accordance with ASTM method D6247-10;

d. comprises a non-combustible, vapor permeable facer adhered to and covering a surface of the polyisocyanurate foam core, wherein the facer is
   i) a woven or nonwoven material having a permeance value of at least 0.35 nanograms per second per square meter per pascal in the water vapor permeability test ASTM E96 Method B using a 150.5 square centimeter test area size, or
   ii) a solid sheet of material having holes at a concentration of 0.1 or more and 5.0 or fewer per square centimeter of facer primary surface where the holes have an average hole size of 0.5 millimeters or greater and 3.0 millimeters or less; and wherein, the polyisocyanurate foam article is attached to the wood-based material with the facer on a surface of the polyisocyanurate foam core that is on an opposite side from the polyisocyanurate foam article surface most proximate to the wood-based material surface it is covering and the article is free of layered gypsum material and cement.

2. The article of claim 1, wherein the polyisocyanurate foam article further comprises glass fibers, where the glass fibers are present at a weight loading of 2 weight-percent or more and 15 weight-percent or less based on total polyisocyanurate foam core weight and are located in one or more than one location selected from a group consisting of (i) distributed within the polyisocyanurate foam core, (ii) residing between the facer and polyisocyanurate foam core, (iii) dispersed within the facer, and (iv) serving as the facer.

3. The article of claim 1 or claim 2, wherein there are vapor permeable and non-combustible facers that are the same or different covering opposing primary surfaces of the polyisocyanurate foam core and the polyisocyanurate foam article is attached to the wood-based material with a facer between the polyisocyanurate foam core and the wood-based material.

4. The article of claim 1 or claim 2, wherein the wood-based material is selected from a group consisting of oriented strand board, plywood, particle board, chip board, dimensional lumber, and laminated veneer lumber.

5. The article of claim 1, wherein the attachment means attaching the polyisocyanurate foam article to the wood-based material is an adhesive that extends around the perimeter of the primary surface of the polyisocyanurate foam article and wherein the article is free of mechanical fasteners as attachment means for attaching the polyisocyanurate foam to the wood-based material.

6. The article of claim 1, wherein the adhesive is one-part polyurethane adhesive, two-part polyurethane adhesive, epoxy adhesive, isocyanurate adhesive, and silicone adhesive.

7. The article of claim 1, wherein the polyisocyanurate foam article has a thickness equal to or less than the perpendicular distance from the exposed primary surface of the wood-based material to a plane extending from outer edges of the top and bottom flanges on the same side as the primary surface of the wood-based material so that the polyisocyanurate foam article does not extend from the wood-based material beyond the top or bottom flange.

8. The article of claim 1, wherein more than one polyisocyanurate foam article is on opposing surfaces of the wood-based material and the polyisocyanurate foam articles on each opposing surface are mated with continuous joints, the continuous joints including lap joints, finger joints, tongue-and-groove joints, or butt joints, such that the joints between polyisocyanurate foam articles on one side of the wood-based material are staggered with respect to the joints between polyisocyanurate foam articles on the opposing side of the wood-based material.

* * * * *